United States Patent [19]

Rachev

[11] Patent Number: 4,802,799

[45] Date of Patent: Feb. 7, 1989

[54] DRILL BIT

[75] Inventor: Marko I. Rachev, Vernon Hills, Ill.

[73] Assignee: Marken Tool Company, Mundelein, Ill.

[21] Appl. No.: 60,153

[22] Filed: Jun. 10, 1987

[51] Int. Cl.4 .............................................. B23B 51/02
[52] U.S. Cl. .................................. 408/144; 76/108 R; 407/62; 407/100; 407/116; 407/118; 408/227
[58] Field of Search .............. 408/144, 199, 200, 223, 408/224–232, 705, 713, 715; 76/108 R; 407/118, 60–62, 100, 114–116

[56] References Cited

U.S. PATENT DOCUMENTS

| 867,639 | 10/1907 | Bragg | 408/223 |
|---|---|---|---|
| 2,204,030 | 6/1940 | Say | 408/223 |
| 2,424,473 | 7/1947 | Luers | 407/116 X |
| 4,356,873 | 11/1982 | Dziak | 76/108 R X |
| 4,583,888 | 4/1986 | Mori et al. | 408/59 |
| 4,688,652 | 8/1987 | Crist | 408/144 X |

FOREIGN PATENT DOCUMENTS

| 1378342 | 12/1974 | United Kingdom | 408/223 |
|---|---|---|---|
| 2085769 | 5/1982 | United Kingdom | 408/144 |

Primary Examiner—John McQuade
Assistant Examiner—Steven C. Bishop
Attorney, Agent, or Firm—Wood, Dalton, Phillips, Mason & Rowe

[57] ABSTRACT

A drill bit tip construction wherein the cutting edge at the tip of the drill bit is arranged to cause fragmentation of the chips being removed from the work metal during the drilling operation. The cutting edge of the drill bit at the drilling tip is made to be wavy and, in the illustrated embodiment, is defined by a plurality of segmentally cylindrical grooves extending parallel to the longitudinal extent of the flutes at the tip. In the illustrated embodiment, the grooves have a radius of approximately 0.05" and a length substantially greater than the radius to permit repeated resharpening of the drill bit with resultant reforming of the desired wavy cutting edge in the resharpened tip. In the illustrated embodiment, the cutting edge is formed in an insert secured as by brazing in a diametric slot at the tip. The insert may be formed of a carbide material having optimum cutting characteristics. The grooves are provided in the insert by use of an electric discharge wire cutting machine.

10 Claims, 2 Drawing Sheets

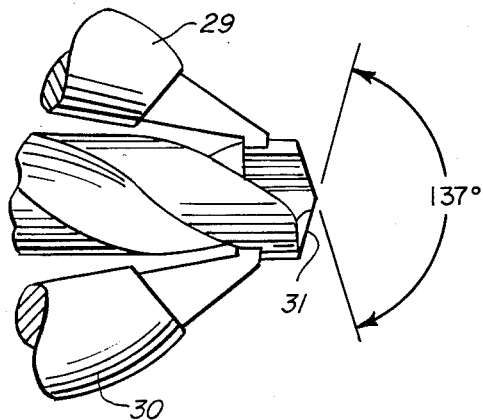
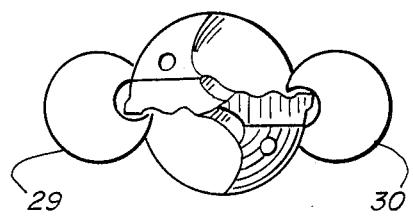
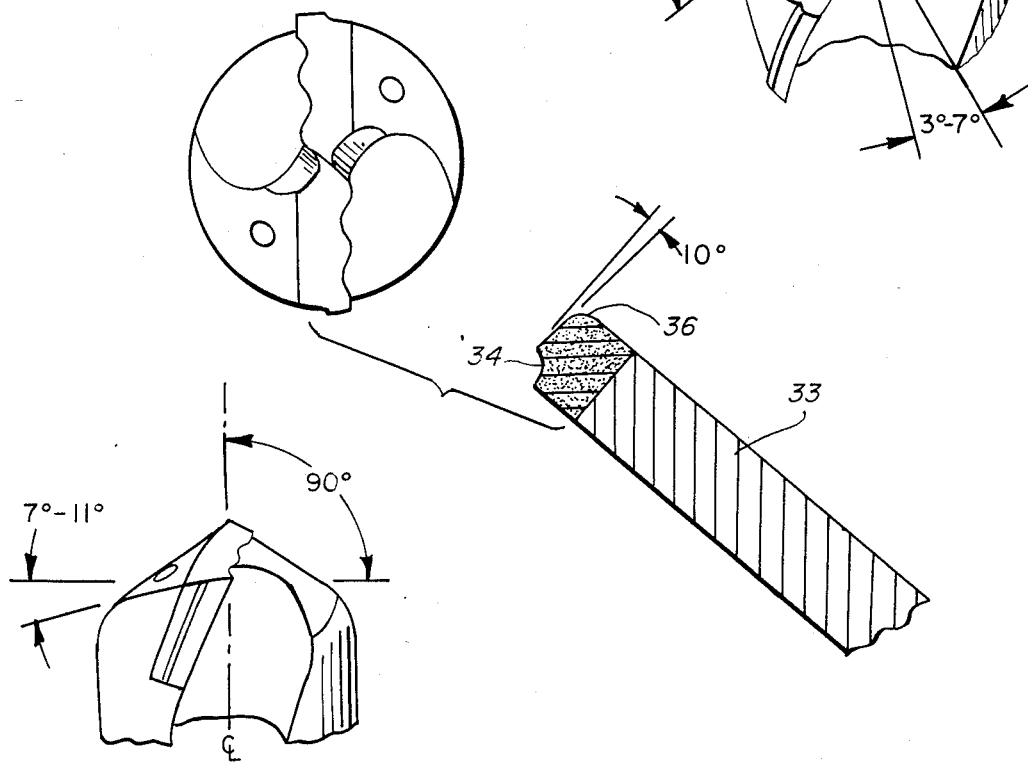

DRILL BIT

TECHNICAL FIELD

This invention relates to drill bits and in particular to the construction of the cutting tip of such drill bits.

BACKGROUND ART

In U.S. Pat. No. 4,583,888 of Yoshikatsu Mori et al., a drill bit is disclosed which is made of cemented carbide. As brought out in that patent, the quality of chip ejection of the drill bit design influences the cutting resistance and, thus, it is considered very important to provide improved chip ejecting ability of such drill bits. As shown in the Mori et al. patent, the drill bit defines a conical tip and a pair of diametrically opposite flutes. The patent teaches a preselected distance between the cutting lip and the flute wall of the drill bit tip to promote chip ejection. As shown, the cutting lip extends across the distal end of the flute. The patent discloses, as prior art, such cutting edges having a generally rectilinear configuration, and the cutting edge of the Mori et al. tool is disclosed as a continuous arcuate edge.

Such conventional drill bit constructions have a serious disadvantage in the forming of relatively large chips from the metal being worked during the drilling operation. These chips tend to interfere with subsequent cutting action, reducing the quality and efficiency of the hole drilling operation.

It is further known to provide, in such drill bit tips, diametrically extending inserts defining the cutting edge. Such inserts are conventionally secured in a slot extending across the drill tip by suitable brazing, or the like. Thus, the cutting edge may be defined by a portion of the drill bit formed of a material differing from the material forming the body of the drill bit.

It is further conventional, in such drill bits, to provide coolant passages extending longitudinally through the body of the bit and opening through the conical tip surface. The coolant lubricates the work during the machining operation and, at the same time, acts to remove the chips previously cut from the work. As discussed above, the prior art structures present a serious problem in the incomplete and inefficient removal of such chips, thereby placing a highly undesirable limitation on the efficiency and speed of such drilling operations. Further, the failure to efficiently remove the chips shortens the useful life of the drill bit by the reengagement of the chips with the cutting edge.

DISCLOSURE OF INVENTION

The present invention comprehends the provision of an improved drill bit construction arranged to cause fragmentation of the chips so as to result in the ready ejection of the relatively small chips from adjacent the tip of the tool during the drilling operation, thereby effectively preventing chip clogging and premature wear of the cutting edge of the drill bit.

More specifically, the invention comprehends the provision in such a drill bit of means on the tip for defining a cutting edge constructed to cause metal chips being cut by the cutting edge to be fragmented.

In the illustrated embodiment, the fragmenting means comprises a portion of the flutes at the tip having grooves extending parallel to the longitudinal extent of the flute.

In the illustrated embodiment, the grooves are rounded and define a serpentine cutting edge.

The length of the grooves is preferably substantially greater than the radius thereof. The invention comprehends the provision of the grooves in an insert secured in a diametric slot extending across the tip of the drill bit and secured therein by suitable means, such as brazing.

In the illustrated embodiment, the insert is formed of micrograin carbide. The insert may be secured in the slot by silver alloy brazing material.

The cutting edge may be provided with a small radius for improved cutting action.

In the illustrated embodiment, the grooves have a radius of approximately 0.05".

The drill bit of the present invention is extremely simple and economical of construction, while yet providing the highly improved functioning and extended useful life discussed above.

BRIEF DESCRIPTION OF THE DRAWING

Other features and advantages of the invention will be apparent from the following description taken in connection with the accompanying drawing wherein:

FIG. 5 is a fragmentary side elevation illustrating a method of holding the insert as a first step in the shaping of the drill tip;

FIG. 6 is an end elevation thereof;

FIG. 7 is an end elevation illustrating the chisel angle of the tip;

FIG. 8 is an end elevation illustrating the use of a grinding wheel for forming the split point notches at the center of the tip; and FIG. 9 is a fragmentary side elevation illustrating the desired clearance angle.

BEST MODE FOR CARRYING OUT THE INVENTION

Figure 1:
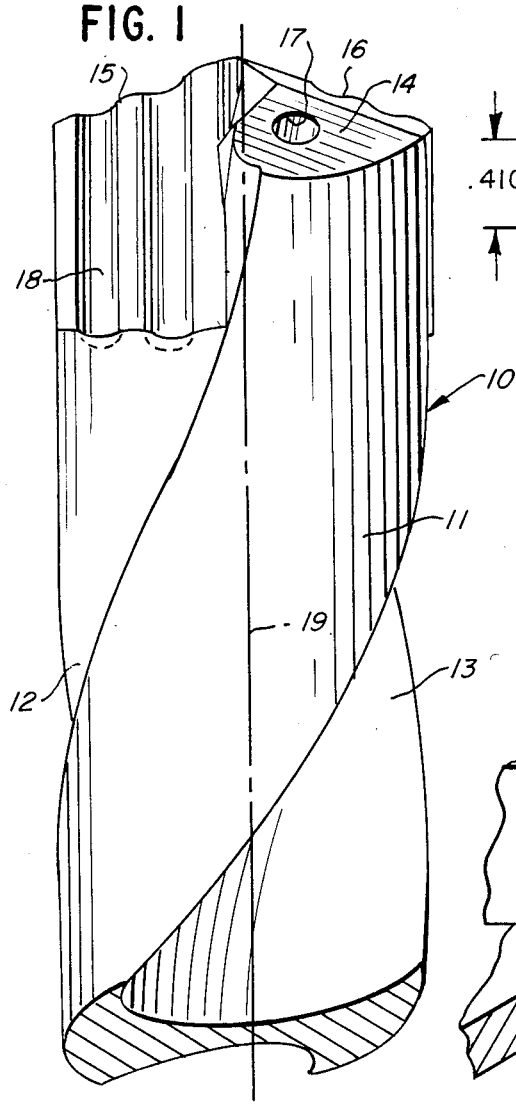
FIG. 1 is a fragmentary side elevation of a drill bit embodying the invention.
Figure 2:
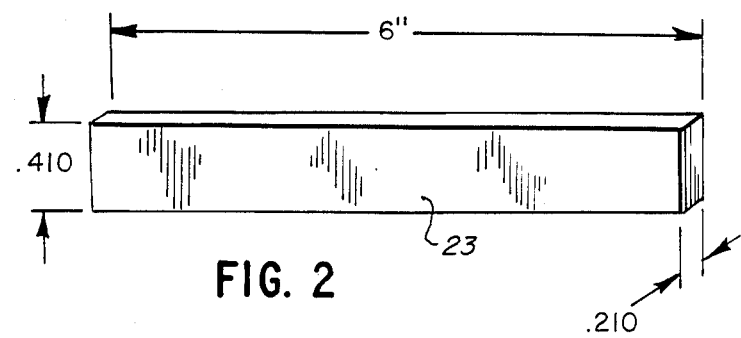
FIG. 2 is a perspective view of a blank from which the insert defining the cutting edge may be formed.
Figure 4:
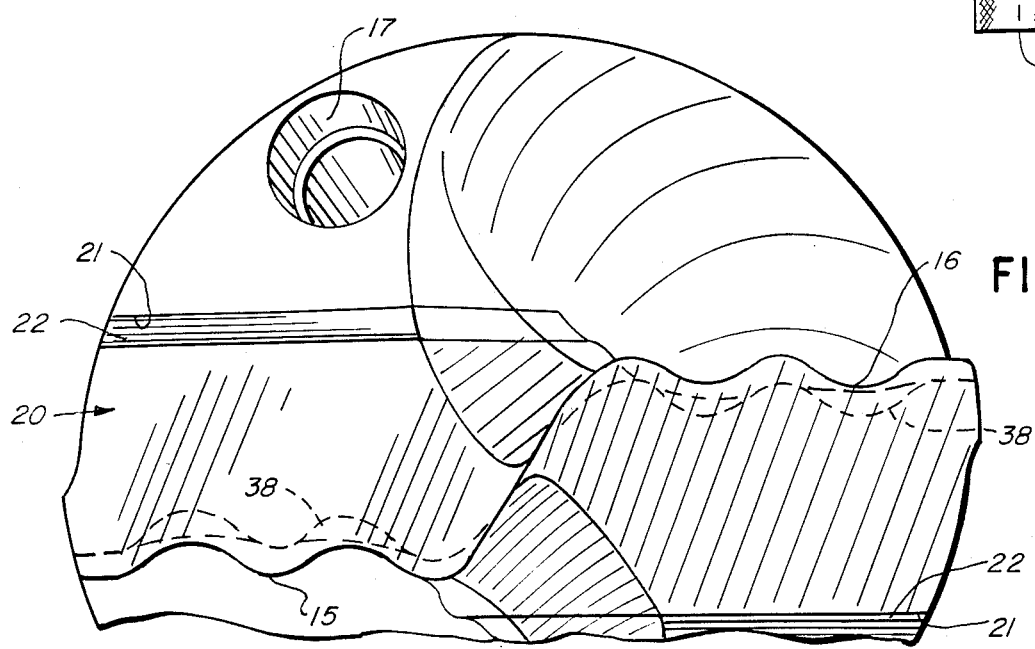
FIG. 4 is a fragmentary enlarged end view of the drill bit tip.

In the illustrative embodiment of the invention as disclosed in the drawing, a drill bit generally designated 10 embodying the invention is shown to comprise a cylindrical drill body 11 having a pair of diametrically opposed helical flutes 12 and 13. The flutes extend to a distal conical tip 14, the inner section of the trailing edge of the flutes, with the tip, defines a pair of cutting edges 15 and 16. Coolant passages 17 are provided in the drill body opening outwardly through the conical tip adjacent the cutting edge 15 and 16, as seen in FIGS. 1 and 4.

As indicated briefly above, the present invention is concerned with the provision of a novel cutting edge construction effectively causing the metal chips cut from the work by the cutting edges 15 and 16 to be fragmented for improved elimination of the chips from the machining area during the drilling operation. More specifically, the invention comprehends the provision of the cutting edges 15 and 16 as wavy cutting edges defined by the distal ends of a plurality of grooves 18 in the drill tip end extending generally parallel to the longitudinal axis 19 of the drill bit body and, more specifically, parallel to the longitudinal extent of the flutes 12 and 13.

The aspect ratio of the grooves 18 is such that the grooves have a length preferably substantially greater than the radius thereof. In the illustrated embodiment, the grooves have a radius of approximately 0.05" and a length of approximately 0.410".

The invention comprehends that the grooves 18 may be provided directly in the material of the drill bit body. In the preferred embodiment, however, the grooves 18 are provided in an insert generally designated 20 mounted in a slot 21 extending diametrically across the tip 14. The insert is secured in the slot by suitable means, such as brazing, and in the illustrated embodiment, by means of silver alloy brazing 22. Illustratively, the insert may be secured in the slot by an induction brazing of a laminate formed of a first outer layer of silver, an intermdiate layer of copper, and a second, opposite layer of silver. The brazing material may be provided in the form of laminated sheet shims, and the brazing of the insert to the drill tip end effected by high frequency induction heating thereof to effect the bonding of the insert to the drill tip end at a temperature in the range of approximately 1100° F. to 1600° F. to provide a firm bond of the insert to the drill tip body. Illustratively, the thickness of the brazing sheet material may be approximately 0.03".

Figure 3:
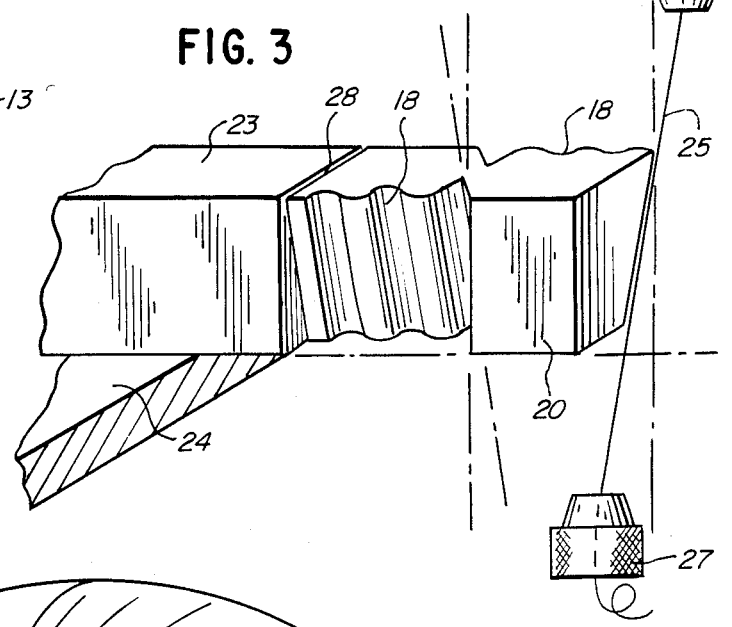
FIG. 3 is a fragmentary perspective view illustrating the formation of the insert grooves by electrical discharge wire machining means.

Insert 20 is preferably formed from a blank 23 of suitable cutting material, such as micrograin carbide blank. Illustratively, the blank may comprise a block 6" long by 0.210" thick by 0.410" wide. The blank is supported on a suitable machine table support 24, and the grooves cut in the opposite faces of the blank by a conventional CNC 4-axis wire electrical discharge machine having a forming wire 25 supported on a pair of wire guides 26 and 27, as shown in FIG. 3. As illustrated in FIG. 3, the wire cuts the opposite faces of the blank to define the plurality of grooves 18 in each of the opposite faces, and may be utilized to sever the formed insert 20 from the blank 23 by effecting a through cut 28.

As shown, the cutting edges 15 and 16 are disposed at opposite sides of the blank at opposite ends thereof. The angle of the grooves 18 is preselected to correspond to the angle of the flutes at the tip portion 14 of the drill bit. The cutting edges 15 and 16, as seen in FIG. 4, define serpentine edges made up of a succession of convex and concave arcuate portions. The grooves, in the illustrated embodiment, have a radius of approximately 0.05", and a height of slightly greater than the height of the blank which, as discussed above in the illustrated embodiment, is 0.410".

After the insert is secured in the slots 21, the tool is ground prior to the final point sharpening. The final point sharpening is illustrated in FIGS. 5-9 and includes the steps of firstly securing the opposite ends of the insert in soft brass jaws 29 and 30. The insert is provided with a conical tip surface 31, having an included angle of approximately 137°. The clearance angle 32, illustrated in FIG. 9, is preferably in the range of approximately 7° to 11° and is provided by means of a conventional radial-relief machine.

The chisel angle illustrated in FIG. 7 is preferably in the range of approximately 3° to 5°.

As shown in FIG. 8, split point notches are provided by means of a diamond grinding wheel 33 having a concave grinding radius 34 of approximately 0.040" and a convex grinding radius 35 of approximately 0.005". The front angle 36 is preferably approximately 10°. The split point notches 37 should be uniform on both sides of the flutes, as shown in FIG. 8.

As illustrated in dotted lines in FIG. 4, a small radius 38 of approximately 0.003" to 0.005" is provided on the cutting edges 15 and 16 for improved cutting edge strength and to prevent the cutting edges from chipping during the drilling process.

While the illustrated embodiment has been described with reference to use of a carbide insert, as will be obvious to those skilled in the art, the insert may be formed of any suitable material, including other conventional tool steels.

By providing a substantial aspect ratio, i.e. length of the grooves 18 to the radius thereof, extended useful life of the tool may be obtained by successive resharpening thereof, as discussed above.

Similarly, the drill body 11 may be formed of a conventional AISI 4140 chromium-molybdenum medium-carbon steel having high hardenability, good fatigue, abrasion and impact resistance characteristics, and high impact strength at high hardness. This material is found to have an extremely high tensile strength when fully hardened. As will be obvious to those skilled in the art, other suitable drill bit materials may be utilized within the broad scope of the invention. The fluting operation may be conducted by conventional 5-axis milling machine, and the slot 21 provided by conventional end mill. The coolant passages may be formed by means of 0.1015 diameter drills and may be drilled sufficiently into the drill bit body to communicate with a conventional axial passage in the lower portion of the body (not shown).

The fluted drill blanks are preferably heat treated to have a relatively high hardness of approximately 45 to 50 "RC" Rockwell hardness.

It has been found that the provision of the wavy cutting edge defined by the plurality of grooves 18 in each of the drill flute trailing edge portions provides an improved fragmentation of the chips produced by the drilling operation, permitting them to be readily flushed from the work area by the coolant fluid delivered through the end of the passages 17, thereby substantially improving the useful life of the drill bit and increasing the efficiency and accuracy of the drilling operation. For facilitated manufacture, the invention further comprehends the provision of the wavy cutting edges in an insert secured in a diametrical slot at the tip of the drill bit. The drill bit is ideally suited for use in modern high speed drilling devices, such as the CNC machining centers and lathes. The use of the micrograin drill bit point having a micro finish formed by means of an electric discharge wire cutting machines, provides a low cost manufacture of the drill bit structure.

The foregoing disclosure of specific embodiments is illustrative of the broad inventive concepts comprehended by the invention.

I claim:

1. In a cylindrical drill defining an axis and having a tip at one end thereof and a pair of diametrically opposite, helical flutes opening into said tip, the improvement comprising:

a diametric slot in said drill bisecting said tip; and
an insert in said slot defining a cutting edge constructed to cause metal chips being cut by said cutting edge to be fragmented, a portion of said insert at said tip having cylindrical grooves each defining a length and a radius, the length of said grooves being substantially greater than the radius thereof, said grooves extending at a preselected acute angle to said drill axis, said cutting edge comprising a wavy edge defined by a pair of oppositely oriented serpentine series of said grooves, said series being symmetrically disposed relative to said drill axis.

2. The drill structure of claim 1 wherein each said groove is approximately 0.05" in radius.

3. The drill structure of claim 1 wherein said insert is formed of carbon steel.

4. The drill structure of claim 1 wherein a body of brazing material is provided in said slot for securing the insert therein.

5. The drill structure of claim 1 wherein a sheet of brazing material is provided in said slot for securing the insert therein.

6. The drill structure of claim 1 wherein a sheet of silver alloy brazing material is provided in said slot for securing the insert therein.

7. The drill structure of claim 1 wherein a sheet of brazing material is provided in said slot for securing the insert therein, said sheet comprising a laminate of a silver layer, a copper layer, and a silver layer.

8. The drill structure of claim 1 wherein said tip comprises a conical tip.

9. The drill structure of claim 1 wherein said cutting edge defines a radius in the range of approximately 0.003" to 0.005".

10. The drill structure of claim 1 wherein said grooves are cylindrical having a radius of approximately 0.05".

* * * * *